United States Patent
Lin et al.

(10) Patent No.: US 9,130,473 B2
(45) Date of Patent: Sep. 8, 2015

(54) POWER FACTOR CORRECTION CIRCUIT, THE CONTROL CIRCUIT AND THE METHOD THEREOF

(71) Applicant: Chengdu Monolithic Power Systems Co., Ltd., Chengdu (CN)

(72) Inventors: Sicong Lin, Hangzhou (CN); Lianfeng Ding, Nanjing (CN); Zhengxing Li, Nanjing (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 250 days.

(21) Appl. No.: 13/928,838

(22) Filed: Jun. 27, 2013

(65) Prior Publication Data

US 2014/0003105 A1     Jan. 2, 2014

(30) Foreign Application Priority Data

Jun. 28, 2012   (CN) .......................... 2012 1 0217452

(51) Int. Cl.
    *H02M 7/217*     (2006.01)
    *H02M 1/42*     (2007.01)

(52) U.S. Cl.
    CPC .......... *H02M 1/4208* (2013.01); *H02M 1/4225* (2013.01); *Y02B 70/126* (2013.01)

(58) Field of Classification Search
    CPC .......................... H02M 1/4208; H02M 1/4225
    USPC .......................................................... 363/89
    See application file for complete search history.

(56) References Cited

U.S. PATENT DOCUMENTS

| | | | | |
|---|---|---|---|---|
| 5,006,975 | A | * | 4/1991 | Neufeld ........................... 363/80 |
| 5,602,465 | A | * | 2/1997 | Clemente ....................... 323/300 |
| 2008/0205103 | A1 | * | 8/2008 | Sutardja et al. ................. 363/84 |
| 2012/0133285 | A1 | * | 5/2012 | Kelly ............................. 315/121 |
| 2012/0139505 | A1 | | 6/2012 | Ren et al. |
| 2012/0201063 | A1 | * | 8/2012 | Sugawara ....................... 363/89 |
| 2012/0293141 | A1 | | 11/2012 | Zhang et al. |
| 2012/0313646 | A1 | * | 12/2012 | Nishikawa .................... 324/415 |
| 2013/0148396 | A1 | * | 6/2013 | Walters ......................... 363/126 |
| 2014/0003105 | A1 | * | 1/2014 | Lin et al. ......................... 363/84 |
| 2015/0062985 | A1 | * | 3/2015 | Colbeck .......................... 363/89 |

* cited by examiner

*Primary Examiner* — Jeffrey Sterrett
(74) *Attorney, Agent, or Firm* — Perkins Coie LLP

(57) ABSTRACT

A power factor correction circuit including a rectifier bridge, an energy storage component, a power switch, a second switch and a control circuit provides reduced THD and improved PF performance under a high input AC voltage.

18 Claims, 7 Drawing Sheets

POWER FACTOR CORRECTION CIRCUIT, THE CONTROL CIRCUIT AND THE METHOD THEREOF

CROSS-REFERENCE TO RELATED APPLICATION(S)

This application claims priority to and the benefit of Chinese Patent Application No. 201210217452.6, filed Jun. 28, 2012, which is incorporated herein by reference in its entirety.

TECHNICAL HELD

The present invention relates to electronic circuits, more specifically, the present invention relates to power factor correction (PFC) circuits, the control circuit and the method thereof.

BACKGROUND

Power factor correction technologies are widely used in power converters. FIG. 1 schematically shows a typical PFC circuit 50 in the prior art. As shown in FIG. 1, the PFC circuit 50 comprises: a rectifier bridge 51, an EMI capacitor $C_{IN}$ and a boost converter 52, wherein the boost converter 52 includes an energy storage component L, a power switch S, a diode D and a capacitor C connected as shown. An input AC voltage $V_{AC}$ is rectified to a DC voltage through the rectifier bridge 51. A peak value of a current flowing through the energy storage component L is controlled to follow the input AC voltage (i.e., the envelop of the current flowing through the energy storage component is controlled to follow the input AC voltage) by the boost converter 52, so as to convert the DC voltage to a regulated voltage $V_O$.

In order to reduce the size of the energy storage component L, prior art uses a clamp circuit to limit the peak value of the current flowing through the energy storage component in boundary mode, with reference to FIG. 2. The higher the clamp ratio (the ratio of the original peak value of the envelop and the clamped value), the higher the reduction of the size of the energy storage component, but the worse the total harmonic distortion (THD) and the power factor (PF). If the clamp ratio is kept constant, the THD would maintains constant as the input AC voltage goes from low to high, but the PF would worsen when the input AC voltage is high due to the phase shifting caused by the EMI capacitor $C_{IN}$.

SUMMARY

It is an object of the present invention to provide an improved power factor correction circuit, the control circuit and the method thereupon, which solves the above problems.

In accomplishing the above and other objects, there has been provided, in accordance with an embodiment of the present invention, a control circuit for a power factor correction circuit, the power factor correction circuit comprising at least a power switch controlled by the control circuit to be ON and OFF to provide a regulated signal based on an input AC voltage, the control circuit comprising: a peak value sample-hold unit configured to receive a line voltage sense signal indicative of the input AC voltage, and to generate a peak value detecting signal; a clamp unit coupled to the peak value sample-hold unit to receive the peak value detecting signal, and to generate a clamp signal; a selecting unit having a first input terminal coupled to the clamp unit to receive the clamp signal, a second input terminal configured to receive the line voltage sense signal, and an output terminal generating a peak current reference signal by selecting the signal with the lower voltage between the clamp signal and the line voltage sense signal; a current comparator having a first input terminal coupled to the output terminal of the selecting unit to receive the peak current reference signal, a second input terminal configured to receive a current sense signal indicative of a current flowing through the power switch, and an output terminal generating a current comparison signal based on the peak current reference signal and the current sense signal; and a controller having a first input terminal coupled to the output terminal of the current comparator to receive the current comparison signal, a second input terminal configured to receive a feedback signal indicative of the regulated voltage, and an output terminal generating a control signal to control the ON and OFF of the power switch.

In addition, there has been provided, in accordance with an embodiment of the present invention, a power factor correction circuit, comprising: a first input port and a second input port configured to receive an input AC voltage; an output port configured to provide a regulated voltage; a rectifier bridge coupled to the first input port and the second input port to receive the input AC voltage, and to generate a DC voltage based thereupon; an energy storage component coupled to the rectifier bridge; a power switch coupled between the energy storage component and a reference ground; a second switch coupled between the energy storage component and the output port, wherein the second switch and the power switch are controlled to be ON and OFF complementarily; and a control circuit configured to provide a control signal to the power switch, wherein the control circuit comprises; a peak value sample-hold unit configured to receive a line voltage sense signal indicative of the input AC voltage, and to generate a peak value detecting signal; a clamp unit coupled to the peak value sample-hold unit to receive the peak value detecting signal, and to generate a clamp signal; a selecting unit having a first input terminal coupled to the clamp unit to receive the clamp signal, a second input terminal configured to receive the line voltage sense signal, and an output terminal generating a peak current reference signal by selecting the signal with the lower voltage between the clamp signal and the line voltage sense signal; a current comparator having a first input terminal coupled to the output terminal of the selecting unit to receive the peak current reference signal, a second input terminal configured to receive a current sense signal indicative of a current flowing through the power switch, and an output terminal generating a current comparison signal based on the peak current reference signal and the current sense signal; and a controller having a first input terminal coupled to the output terminal of the current comparator to receive the current comparison signal, a second input terminal configured to receive a feedback signal indicative of the regulated voltage, and an output terminal generating a control to control the ON and OFF of the power switch.

Furthermore, there has been provided, in accordance with an embodiment of the present invention, a method used for a power factor correction circuit configured to provide a regulated voltage, wherein the power factor correction circuit comprises at least a power switch, the method comprising: receiving an input AC voltage; rectifying the input AC voltage to a DC voltage; generating a peak value detecting signal by sampling and holding the peak value of a line voltage sense signal indicative of the DC voltage; generating a damp signal in response to the peak value detecting signal and a threshold coefficient; comparing the damp signal with the line voltage sense signal to select the signal with the lower voltage as a peak current reference signal; comparing the peak current reference signal with a current sense signal indicative of a current flowing through the power switch to generate a current comparison signal; and generating a control signal in response to the current comparison signal and a feedback signal indicative of the regulated voltage to control the power switch to be ON and OFF.

DETAILED DESCRIPTION

Embodiments of circuits for power factor correction circuit and the control circuit are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
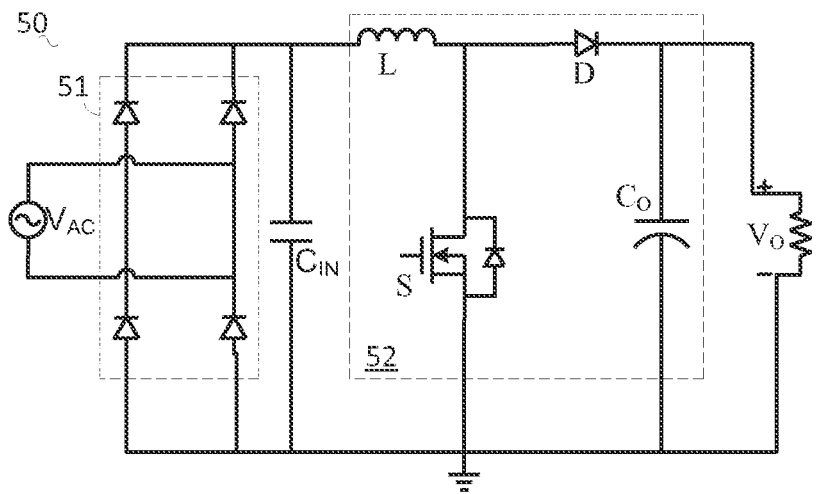
FIG. 1 schematically shows a typical PFC circuit 50 in the prior art.
Figure 2:
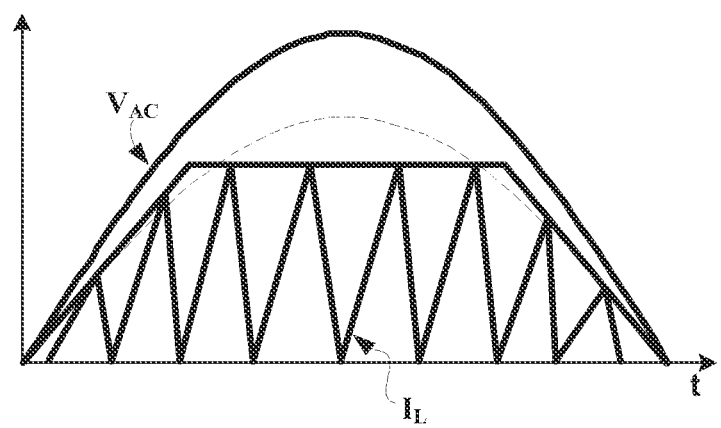
FIG. 2 schematically shows the waveforms of the input AC voltage ($V_{AC}$) and the current ($I_L$) flowing through the energy storage component in the PFC circuit 50 in FIG. 1.
Figure 3:
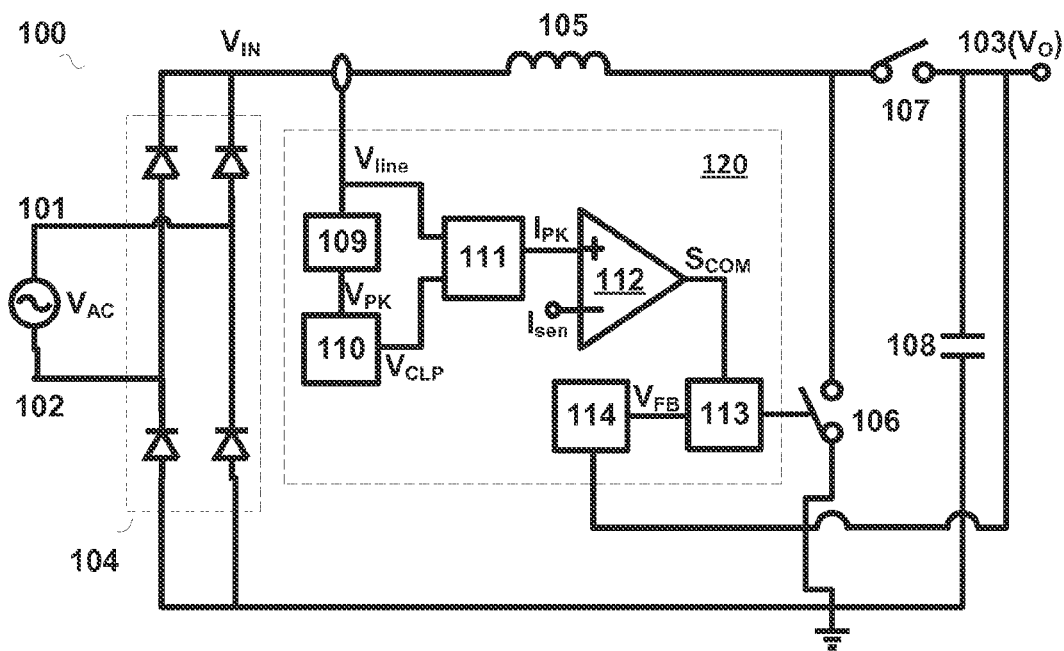
FIG. 3 schematically shows a power factor correction circuit 100 in accordance with an embodiment of the present invention.

FIG. 3 schematically shows a power factor correction circuit 100 in accordance with an embodiment of the present invention. In the example of FIG. 3, the power factor correction circuit 100 comprises: a first input port 101 and a second input port 102 configured to receive an input AC voltage $V_{AC}$; an output port 103 configured to provide a regulated voltage $V_O$; a rectifier bridge 104 coupled to the first input port 101 and the second input port 102 to receive the input AC voltage $V_{AC}$, and based on the input AC voltage $V_{AC}$, the rectifier bridge 104 generates a DC voltage $V_{IN}$; an energy storage component 105 having a first end and a second end, wherein the first end is coupled to the rectifier bridge 104; a power switch 106 coupled between the second end of the energy storage component 105 and a reference ground; a second switch 107 coupled between the second end of the energy storage component 105 and the output port 103, wherein the second switch 107 and the power switch 106 are controlled to be ON and OFF complementarily; and a control circuit 120 configured to provide a control signal to the power switch 106, wherein the control circuit 120 comprises: a peak value sample-hold unit 109 configured to receive a line voltage sense signal $V_{line}$ indicative of the input AC voltage $V_{AC}$, and to generate a peak value detecting signal $V_{PK}$ (i.e., the peak voltage of the line voltage sense signal $V_{line}$) based thereupon; a clamp unit 110 coupled to the peak value sample-hold unit 109 to receive the peak value detecting signal $V_{PK}$, and to generate a clamp signal $V_{CLP}$ based thereupon; a selecting unit 111 having a first input terminal, a second input terminal and an output terminal, wherein the first input terminal is coupled to the clamp unit 110 to receive the clamp signal $V_{CLP}$, the second input terminal is configured to receive the line voltage sense signal $V_{line}$, wherein based on selecting the signal with the lower voltage between the clamp signal $V_{CLP}$ and the line voltage sense signal $V_{line}$, the selecting unit 111 generates a peak current reference signal $I_{PK}$ at the output; a current comparator 112 having a first input terminal, a second input terminal and an output terminal, wherein the first input terminal is coupled to the output terminal of the selecting unit 111 to receive the peak current reference signal $I_{PK}$, the second input terminal is configured to receive a current sense signal $I_{sen}$ indicative of a current flowing through the power switch 106, and wherein based on the peak current reference signal $I_{PK}$ and the current sense signal $I_{sen}$, the current comparator 112 generates a current comparison signal $S_{COM}$ at the output terminal; and a controller 113 having a first input terminal, a second input terminal and an output terminal, wherein the first input terminal is coupled to the output terminal of the current comparator 112 to receive the current comparison signal $S_{COM}$, the second input terminal is configured to receive a feedback signal $V_{FB}$ indicative of the regulated voltage $V_O$, and wherein based on the current comparison signal $S_{COM}$ and the feedback signal $V_{FB}$, the controller 113 generates the control signal at the output terminal to control the ON and OFF of the power switch 106.

In the example of FIG. 3, the energy storage component 105 comprises an inductor having a first end and a second end, wherein the first end is coupled to the rectifier bridge 104, and the second end is coupled to the power switch 106 and the second switch 107.

In one embodiment, the second switch 107 comprises a diode.

In one embodiment, the feedback signal $V_{FB}$ is generated by a feedback circuit 114, wherein the feedback circuit 114 is coupled to the output port 103 to receive the regulated voltage $V_O$, and to generate the feedback signal $V_{FB}$ based thereupon.

Figure 4:
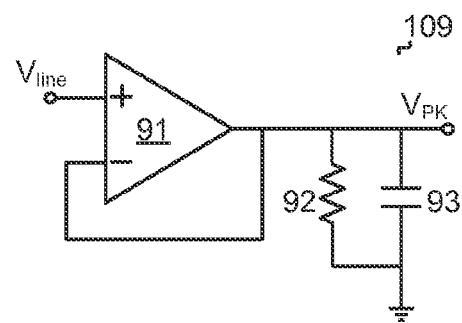
FIG. 4 schematically shows a circuit configuration of the peak value sample-hold unit 109 in accordance with an embodiment of the present invention.

FIG. 4 schematically shows a circuit configuration of the peak value sample-hold unit 109 in accordance with an embodiment of the present invention. In the example of FIG. 4, the peak value sample-hold unit 109 comprises: an operational amplifier 91 having a first input terminal, a second input terminal and an output terminal, wherein the first input terminal is configured to receive the line voltage sense signal $V_{line}$, the second input terminal is coupled to the output terminal; a sample resistor 92 coupled between the output terminal of the operational amplifier 91 and the reference ground; and a sample capacitor 93 coupled between the output terminal of the operational amplifier 91 and the reference ground; wherein the peak value detecting signal $V_{PK}$ is generated at the output terminal of the operational amplifier 91.

In one embodiment, the ratio of the clamp signal $V_{CLP}$ and the peak value detecting signal $V_{PK}$ has 3 different levels as the peak value detecting signal $V_{PK}$ varies; when the peak value detecting signal $V_{PK}$ is lower than a first reference voltage $V_{ref1}$, the ratio of the damp signal $V_{CLP}$ and the peak value detecting signal $V_{PK}$ has a first value $k_1$; when the peak value detecting signal $V_{PK}$ is between the first reference voltage $V_{ref1}$ and a second reference voltage $V_{ref2}$, the ratio of the damp signal $V_{CLP}$ and the peak value detecting signal $V_{PK}$ has a second value $k_2$; and when the peak value detecting signal $V_{PK}$ is higher than the second reference voltage $V_{ref2}$, the ratio of the damp signal $V_{CLP}$ and the peak value detecting signal $V_{PK}$ has a third value $k_3$, wherein the first reference voltage $V_{ref1}$ is lower than the second reference voltage $V_{ref2}$, the first value $k_1$ is lower than the second value $k_2$, the second value $k_2$ is lower than the third value $k_3$, and the third value $k_3$ is not higher than 1. That is:

$$\frac{V_{CLP}}{V_{PK}} = \begin{cases} k_1 & (V_{PK} < V_{ref1}) \\ k_2 & (V_{ref1} \le V_{PK} \le V_{ref2}) \\ k_3 & (V_{PK} > V_{ref2}) \end{cases} \quad (1)$$

Figure 5:
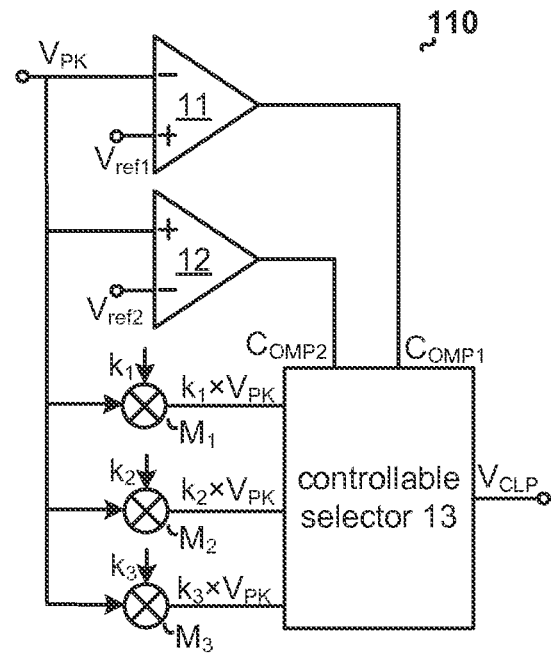
FIG. 5 schematically shows a circuit configuration of the clamp unit 110 in accordance with an embodiment of the present invention.

FIG. 5 schematically shows a circuit configuration of the clamp unit 110 in accordance with an embodiment of the present invention. In the example of FIG. 5, the clamp unit 110 comprises: a first comparator 11 having a first input terminal, a second input terminal and an output terminal, wherein the first input terminal is configured to receive the peak value detecting signal $V_{PK}$, the second input terminal is configured to receive the first reference voltage $V_{ref1}$, wherein based on the peak value detecting signal $V_{PK}$ and the first reference voltage $V_{ref1}$, the first comparator 11 generates a first comparison signal $C_{OMP1}$ at the output terminal; a second comparator 12 having a first input terminal, a second input terminal and an output terminal, wherein the first input terminal is configured to receive the peak value detecting signal $V_{PK}$, the second input terminal is configure to receive the second reference voltage $V_{ref2}$, wherein based on the peak value detecting signal $V_{PK}$ and the second reference voltage $V_{ref2}$, the second comparator 12 generates a second comparison signal $C_{OMP2}$ at the output terminal; a first arithmetic unit $M_1$ having a first input terminal, a second input terminal and an output terminal, wherein the first input terminal is configured to receive the peak value detecting signal $V_{PK}$, the second input terminal is configured to receive the first value $k_1$, wherein the arithmetic unit $M_1$ generates a first damp level $k_1 \times V_{PK}$ at the output terminal by multiplying the peak value detecting signal $V_{PK}$ with the first value $k_1$; a second arithmetic unit $M_2$ having a first input terminal, a second input terminal and an output terminal, wherein the first input terminal is configured to receive the peak value detecting signal $V_{PK}$, the second input terminal is configured to receive the second value $k_2$, wherein the second arithmetic unit $M_2$ generates a second damp level $k_2 \times V_{PK}$ at the output terminal by multiplying the peak value detecting signal $V_{PK}$ with the second value $k_2$; a third arithmetic unit $M_3$ having a first input terminal, a second input terminal and an output terminal, wherein the first input terminal is configure to receive the peak value detecting signal $V_{PK}$, the second input terminal is configured to receive the third value $k_3$, wherein the third arithmetic unit $M_3$ generates a third clamp level $k_3 \times V_{PK}$ at the output terminal by multiplying the peak value detecting signal $V_{PK}$ with the third value $k_3$; and a controllable selector 13 having a first input terminal, a second input terminal, a third input terminal, a first control terminal, a second control terminal and an output terminal, wherein the first input terminal is coupled to the output terminal of the first arithmetic unit $M_1$ to receive the first clamp level $k_1 \times V_{PK}$, the second input terminal is coupled to the output terminal of the second arithmetic unit $M_2$ to receive the second clamp level $k_2 \times V_{PK}$, the third input terminal is coupled to the output terminal of the third arithmetic unit $M_3$ to receive the third clamp level $k_3 \times V_{PK}$, the first control terminal is coupled to the output terminal of the first comparator 11 to receive the first comparison signal $C_{OMP1}$, the second control terminal is coupled to the output terminal of the second comparator 12 to receive the second comparison signal $C_{OMP2}$, wherein based on the first comparison signal $C_{OMP1}$ and the second comparison signal $C_{OMP2}$, the controllable selector 13 selects either the first clamp level $k_1 \times V_{PK}$, the second clamp level $k_2 \times V_{PK}$ or the third clamp level $k_3 \times V_{PK}$ as the clamp signal $V_{CLP}$ at the output terminal.

In one embodiment, the first arithmetic unit $M_1$, the second arithmetic unit $M_2$ and the third arithmetic unit $M_3$ all comprise a multiplier.

Figure 6:
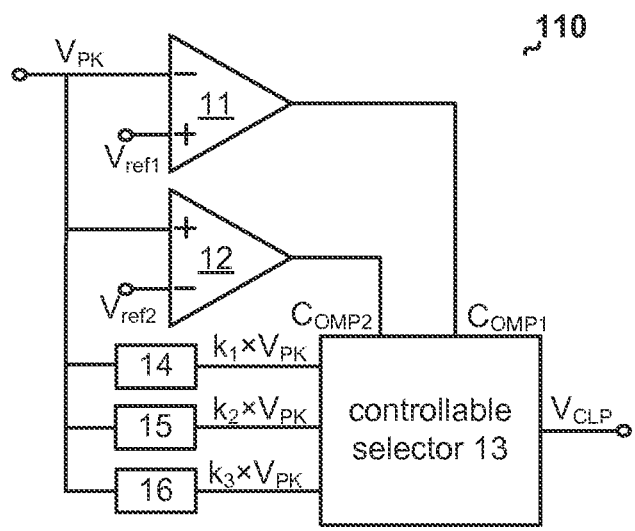
FIG. 6 schematically shows a circuit configuration of the clamp unit 110 in accordance with an embodiment of the present invention.

In one embodiment, the first clamp level $k_1 \times V_{PK}$, the second clamp level $k_2 \times V_{PK}$ and the third clamp level $k_3 \times V_{PK}$ may be derived from the peak value detecting signal $V_{PK}$, as the damp unit 110 shown in FIG. 6. In the example of FIG. 6, the damp unit 110 comprises: a first comparator 11 having a first input terminal, a second input terminal and an output terminal, wherein the first input terminal is configured to receive the peak value detecting signal $V_{PK}$, the second input terminal is configured to receive the first reference voltage $V_{ref1}$, wherein based on the peak value detecting signal $V_{PK}$ and first reference voltage $V_{ref1}$, the first comparator 11 generates a first comparison signal $C_{OMP1}$ at the output terminal; a second comparator 12 having a first input terminal, a second input terminal and an output terminal, wherein the first input terminal is configured to receive the peak value detecting signal $V_{PK}$, the second input terminal is configure to receive the second reference voltage $V_{ref2}$, wherein based on the peak value detecting signal $V_{PK}$ and the second reference voltage $V_{ref2}$, the second comparator 12 generates a second comparison signal $C_{OMP2}$ at the output terminal; a first voltage divider 14 with a first dividing coefficient $k_1$ configured to receive the peak value detecting signal $V_{PK}$, and to generate a first damp level $k_1 \times V_{PK}$ based thereupon; a second voltage divider 15 with a second dividing coefficient $k_2$ configured to receive the peak value detecting signal $V_{PK}$, and to generate a second clamp level $k_2 \times V_{PK}$ based thereupon; a third voltage divider 16 with a third dividing coefficient $k_3$ configured to receive the peak value detecting signal $V_{PK}$, and to generate a third clamp level $k_3 \times V_{PK}$ based thereupon; and a controllable selector 13 having a first input terminal, a second input terminal, a third input terminal, a first control terminal, a second control terminal and an output terminal, wherein the first input terminal is coupled to the first voltage divider 14 to receive the first clamp level $k_1 \times V_{PK}$, the second input terminal is coupled to the second voltage divider 15 to receive the second clamp level $k_2 \times V_{PK}$, the third input terminal is coupled to the third voltage divider 16 to receive the third clamp level $k_3 \times V_{PK}$, the first control terminal is coupled to the output terminal of the first comparator 11 to receive the first comparison signal $C_{OMP1}$, the second control terminal is coupled to the output terminal of the second comparator 12 to receive the second comparison signal $C_{OMP2}$, wherein based on the first comparison signal $C_{OMP1}$ and the second comparison signal $C_{OMP2}$, the controllable selector 13 selects either the first clamp level $k_1 \times V_{PK}$, the second clamp level $k_2 \times V_{PK}$ or the third clamp level $k_3 \times V_{PK}$ as the clamp signal $V_{CLP}$ at the output terminal.

In the examples of FIG. 5 and FIG. 6, when the peak value detecting signal $V_{PK}$ is lower than the first reference voltage $V_{ref1}$, the controllable selector 13 selects he first damp level $k_1 \times V_{PK}$ as the damp signal $V_{CLP}$; when the peak value detecting signal $V_{PK}$ is between the first reference voltage $V_{ref1}$ and the second reference voltage $V_{ref2}$, the controllable selector 13 selects the second damp level $k_2 \times V_{PK}$ as the damp signal $V_{CLP}$; when the peak value detecting signal $V_{PK}$ is higher than the third reference voltage $V_{ref3}$, the controllable selector 13 selects the third damp level $k_3 \times V_{PK}$ as the damp signal $V_{CLP}$.

Figure 7:
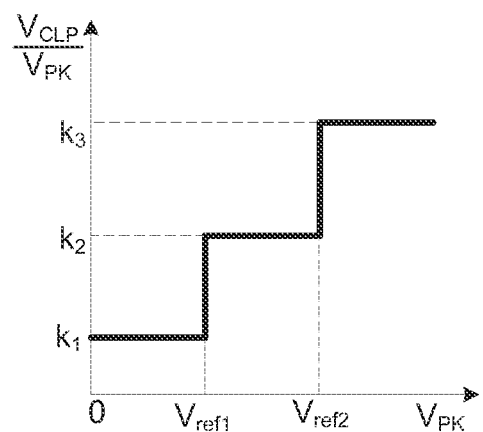
FIG. 7 schematically shows the relationship of the ratio of the clamp signal ($V_{CLP}$) and the peak value detecting signal ($V_{PK}$) versus the peak value detecting signal ($V_{PK}$) in FIG. 5 and FIG. 6.

The damp signal $V_{CLP}$ generated by the damp unit 110 in FIG. 5 and FIG. 6 meets equation (1). That is, the clamp signal $V_{CLP}$ has 3 levels as the ratio of the clamp signal $V_{CLP}$ and the peak value detecting signal $V_{PK}$ varies, as shown in FIG. 7 which schematically shows the relationship of the ratio of the clamp signal $V_{CLP}$ and the peak value detecting signal $V_{PK}$ versus the peak value detecting signal $V_{PK}$. During the operation of the power factor correction circuit 100, the peak value sample-hold unit 109 detects the peak voltage of the line voltage sense signal $V_{line}$ which indicates the input AC voltage. When the peak voltage increases, the clamp signal $V_{CLP}$ also increases, but the ratio of the clamp signal $V_{CLP}$ and the peak value detecting signal $V_{PK}$ is lower than or equal to 1 (it has 3 different values that is respectively lower than or equal to 1 as the increase of the peak value detecting signal $V_{PK}$ as shown in the examples in FIG. 5 and FIG. 6). That is, the clamp signal $V_{CLP}$ is lower than or equal to the peak value detecting signal $V_{PK}$. As a result, several embodiments of the foregoing power factor correction circuit provide reduced THD and improved PF performance under a high input AC voltage compared to conventional technique discussed above.

Figure 8:
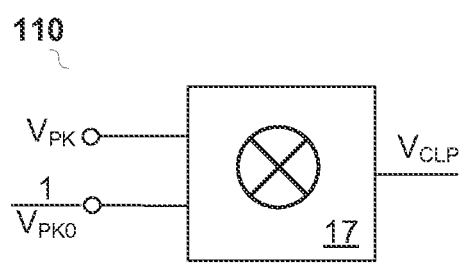
FIG. 8 schematically shows a circuit configuration of the clamp unit 110 in accordance with an embodiment of the present invention.
Figure 9:
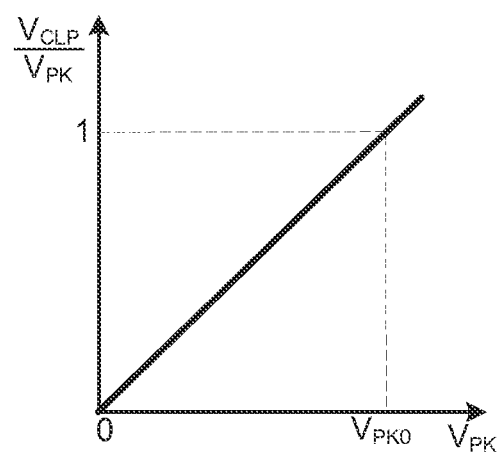
FIG. 9 schematically shows the relationship of the ratio of the damp signal ($V_{CLP}$) and the peak value detecting signal ($V_{PK}$) versus the peak value detecting signal ($V_{PK}$) in FIG. 8.

FIG. 8 schematically shows a circuit configuration of the clamp unit 110 in accordance with an embodiment of the present invention. In the example of FIG. 8, the clamp unit 110 comprises: an arithmetic block 17 having a first input terminal, a second input terminal and an output terminal, wherein the first input terminal is configured to receive the peak value detecting signal $V_{PK}$, the second input terminal is configured to receive a threshold coefficient $1/V_{PK0}$, and wherein the arithmetic block 17 generates the clamp signal $V_{CLP}$ at the output terminal by multiplying the threshold coefficient $1/V_{PK0}$ with the square of the peak value detecting signal $V_{PK}$, as shown in FIG. 9 which schematically shows the relationship of the ratio of the damp signal $V_{CLP}$ and the peak value detecting signal $V_{PK}$ versus the peak value detecting signal $V_{PK}$. That is:

$$V_{CLP} = \frac{V_{PK}}{V_{PK0}} \times V_{PK} \qquad (2)$$

In one embodiment, the arithmetic block 17 comprises a multiplier.

Figure 10:
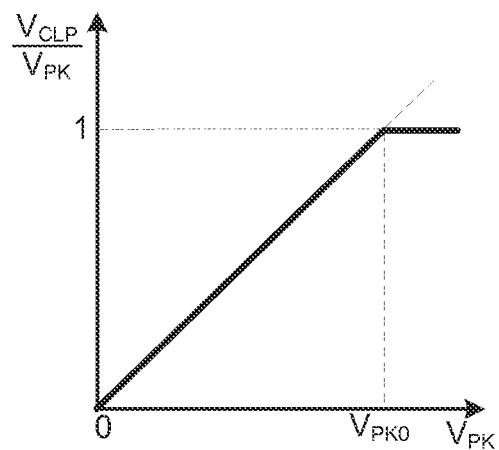
FIG. 10 schematically shows the relationship of the ratio of the damp signal ($V_{CLP}$) and the peak value detecting signal ($V_{PK}$) versus the peak value detecting signal ($V_{PK}$) in FIG. 8.

In one embodiment, when the peak value detecting signal $V_{PK}$ reaches a voltage threshold $V_{PK0}$, wherein the voltage threshold $V_{PK0}$ is a reciprocal value of the threshold coefficient $1/V_{PK0}$, the clamp signal $V_{CLP}$ generated by the arithmetic block 17 follows the peak value detecting signal $V_{PK}$, as shown in FIG. 10 which schematically shows the relationship of the ratio of the clamp signal $V_{CLP}$ and the peak value detecting signal VPK versus the peak value detecting signal $V_{PK}$. That is:

$$V_{CLP} = \begin{cases} \dfrac{V_{PK}}{V_{PK0}} \times V_{PK} & (V_{PK} < V_{PK0}) \\ V_{PK} & (V_{PK} \geq V_{PK0}) \end{cases} \qquad (3)$$

Figure 11:
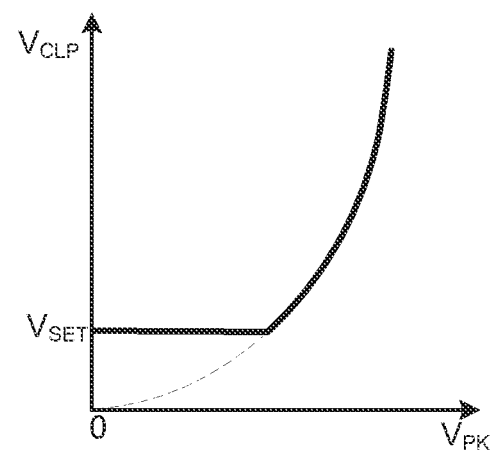
FIG. 11 schematically shows the relationship of the ratio of the damp signal ($V_{CLP}$) and the peak value detecting signal ($V_{PK}$) versus the peak value detecting signal ($V_{PK}$) in accordance with an embodiment of the present invention.

In one embodiment, when the peak value detecting signal $V_{PK}$ is low, so that the clamp signal $V_{CLP}$ which meets the function (2) or function (3) is lower than a set voltage $V_{SET}$, the clamp signal $V_{CLP}$ generated by the clamp unit 110 may be hold at the set voltage $V_{SET}$, as shown in FIG. 11.

Figure 12:
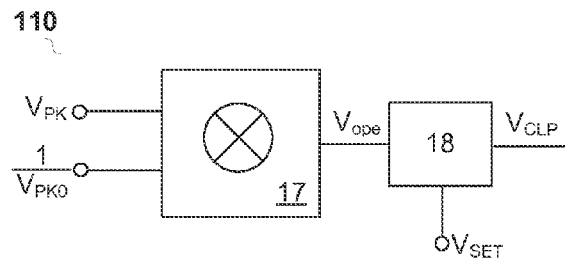
FIG. 12 schematically shows a circuit configuration of the damp unit 110 which realizes the relationship of the clamp signal ($V_{CLP}$) versus the peak value detecting signal ($V_{PK}$) shown in FIG. 11 in accordance with an embodiment of the present invention.

FIG. 12 schematically shows a circuit configuration of the clamp unit 110 in accordance with an embodiment of the present invention. As will be discussed below, the clamp unit 110 in FIG. 12 realizes the relationship of the clamp signal $V_{CLP}$ versus the peak value detecting signal $V_{PK}$ shown in FIG. 11. In the example of FIG. 12, the clamp unit 110 comprises: an arithmetic block 17 having a first input terminal, a second input terminal and an output terminal, wherein the first input terminal is configured to receive the peak value detecting signal $V_{PK}$, the second input terminal is configured to receive a threshold coefficient $1/V_{PK0}$, and wherein the arithmetic block 17 generates an arithmetic signal $V_{ope}$ at the output terminal by multiplying the threshold coefficient $1/V_{PK0}$ with the square of the peak value detecting signal $V_{PK}$; and a selecting block 18 having a first input terminal, a second input terminal and an output terminal, wherein the first input terminal is coupled to the output terminal of the arithmetic block 17 to receive the arithmetic signal $V_{ope}$, and the second input terminal is configured to receive a set voltage $V_{SET}$, wherein based on selecting the signal with the higher voltage between the arithmetic signal $V_{ope}$ and the set voltage $V_{SET}$, the selecting block 18 generates the clamp signal $V_{CLP}$ at the output terminal.

During the operation of the power factor correction circuit 100, the peak value sample-hold unit 109 detects the peak voltage of the line voltage sense signal $V_{line}$ which indicates the input AC voltage. When the peak voltage increases, the clamp signal $V_{CLP}$ also increases, but the ratio of the clamp signal $V_{CLP}$ and the peak value detecting signal $V_{PK}$ is lower than or equal to 1, i.e., the clamp signal $V_{CLP}$ is lower than or equal to the peak value detecting signal $V_{PK}$. Even if the ratio of the clamp signal $V_{CLP}$ and the peak value detecting signal $V_{PK}$ is higher than 1, the peak current reference signal $I_{PK}$ is maintained to be lower than or equal to the peak value detecting signal $V_{PK}$ due to the operation of the selecting unit 111. As a result, several embodiments of the foregoing power factor correction circuit provide reduced THD and improved PF performance under a high input AC voltage compared to conventional technique discussed above.

Figure 13:
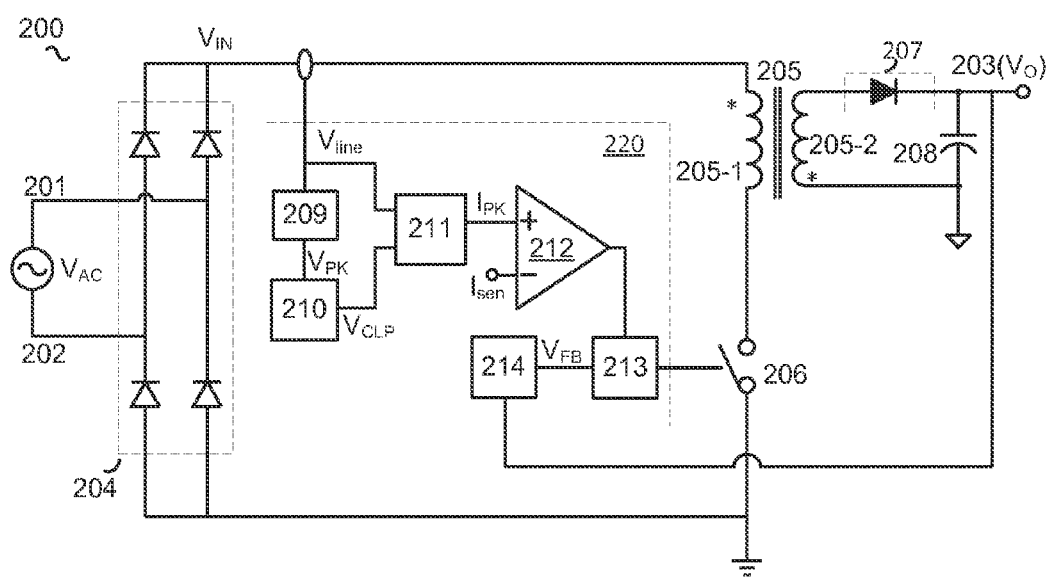
FIG. 13 schematically shows a power factor correction circuit 200 in accordance with an embodiment of the present invention.

Several embodiments of the foregoing power factor correction circuit are with boost topology as the main circuit. But one skilled in the art should realize that the power factor correction circuit may also with other topologies (e.g., flyback topology) as the main circuit. FIG. 13 schematically shows a power factor correction circuit 200 in accordance with an embodiment of the present invention.

In the example of FIG. 13, the power factor correction circuit 200 comprises: a first input port 201 and a second input port 202 configured to receive an input AC voltage $V_{AC}$; an output port 203 configured to provide a regulated voltage $V_O$; a rectifier bridge 204 coupled to the first input port 201 and the second input port 202 to receive the input AC voltage $V_{AC}$, and based on the input AC voltage $V_{AC}$, the rectifier bridge 204 generates a DC voltage $V_{IN}$; a transformer 205 including a primary winding 205-1 and a secondary winding 205-2, wherein the primary winding 205-1 and the secondary winding 205-2 respectively has a first end and a second end, and wherein the first end of the primary winding 205-1 and the second end of the secondary winding 205-2 are configured as dotted terminals, the first end of the primary winding 205-1 is coupled to the rectifier bridge 204, and the second end of the secondary winding 205-2 is coupled to a secondary reference ground; a power switch 206 coupled between the second end of the primary winding 205-1 and a primary reference ground; a second switch 207 coupled between the first end of the secondary winding 205-2 and the output port 203, wherein the second switch 207 and the power switch 206 are controlled to be ON and OFF complementarily; and a control circuit 220 configured to provide a control signal to the power switch 206.

The configuration of the control circuit 220 and the operation principle of the power factor correction circuit 200 are similar to that of the power factor correction circuit 100 in FIG. 3.

Figure 14:
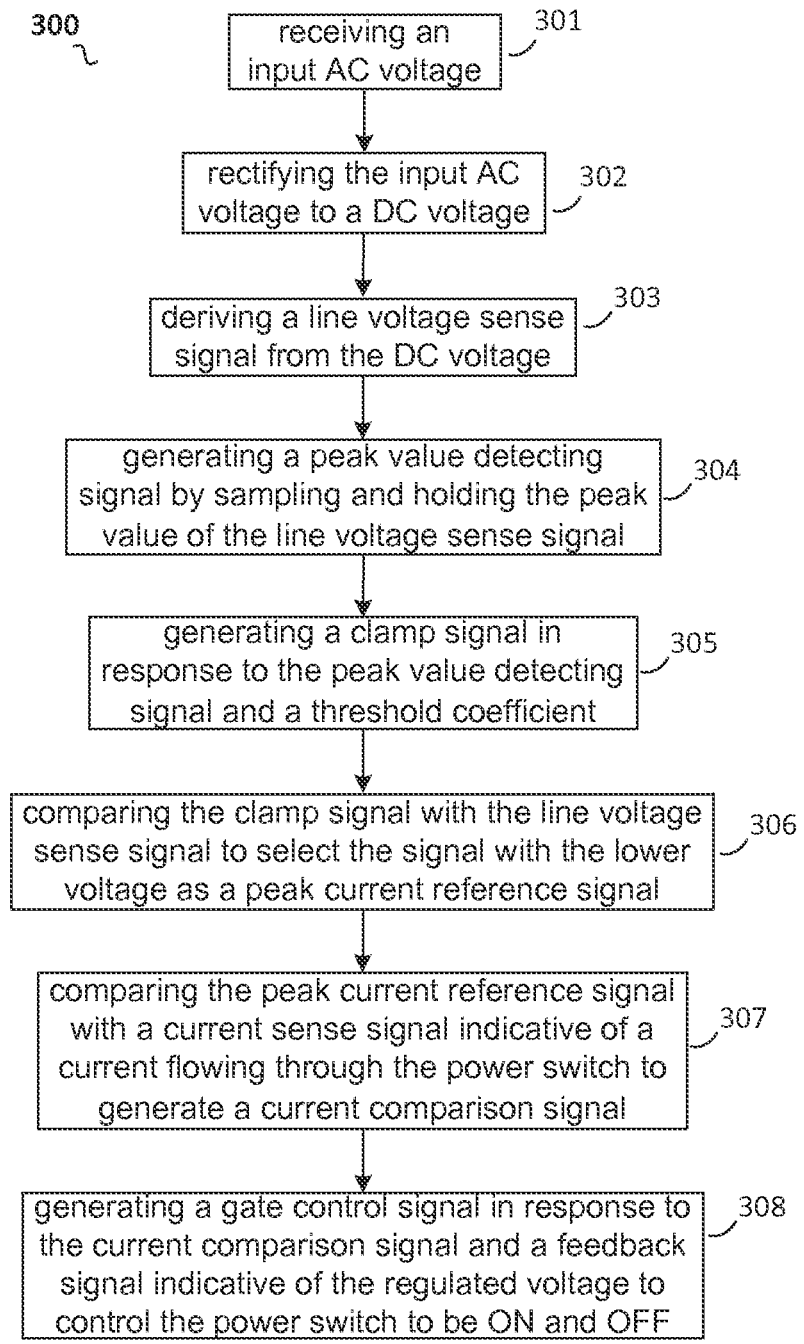
FIG. 14 schematically shows a flowchart 300 of the method used for a power factor correction circuit configured to provide a regulated voltage in accordance with an embodiment of the present invention The use of the similar reference label n different drawings indicates the same of like components.

Furthermore, the present invention provides a method used for a power factor correction circuit. FIG. 14 schematically shows a flowchart 300 of the method used for a power factor correction circuit configured to provide a regulated voltage in accordance with an embodiment of the present invention, wherein the power factor correction circuit comprises a power switch, and wherein the method comprises:

Step 301, receiving an input AC voltage;

Step 302, rectifying the input AC voltage to a DC voltage;

Step 303, deriving a line voltage sense signal from the DC voltage;

Step 304, generating a peak value detecting signal by sampling and holding the peak value of the line voltage sense signal;

Step 305, generating a damp signal in response to the peak value detecting signal and a threshold coefficient;

Step 306, comparing the clamp signal with the line voltage sense signal to select the signal with the lower voltage as a peak current reference signal;

Step 307, comparing the peak current reference signal with a current sense signal indicative of a current flowing through the power switch to generate a current comparison signal; and Step 308, generating a control signal in response to the current comparison signal and a feedback signal indicative of the regulated voltage to control the power switch to be ON and OFF.

In one embodiment, the step of "generating a damp signal in response to the peak value detecting signal and a threshold coefficient" comprises: multiplying the threshold coefficient and the square of the peak value detecting signal to generate the damp signal.

It is to be understood in these letters patent that the meaning of "A" is coupled to "B" is that either A and B are connected to each other as described above, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

We claim:

1. A control circuit for a power factor correction circuit, the power factor correction circuit comprising at least a power switch controlled by the control circuit to be ON and OFF to provide a regulated signal based on an input AC voltage, the control circuit comprising:
    a peak value sample-hold unit configured to receive a line voltage sense signal indicative of the input AC voltage, and to generate a peak value detecting signal;
    a clamp unit coupled to the peak value sample-hold unit to receive the peak value detecting signal, and to generate a clamp signal;
    a selecting unit having a first input terminal coupled to the clamp unit to receive the clamp signal, a second input terminal configured to receive the line voltage sense signal, and an output terminal generating a peak current reference signal by selecting the signal with the lower voltage between the clamp signal and the line voltage sense signal;
    a current comparator having a first input terminal coupled to the output terminal of the selecting unit to receive the peak current reference signal, a second input terminal configured to receive a current sense signal indicative of a current flowing through the power switch, and an output terminal generating a current comparison signal based on the peak current reference signal and the current sense signal; and
    a controller having a first input terminal coupled to the output terminal of the current comparator to receive the current comparison signal, a second input terminal configured to receive a feedback signal indicative of the regulated voltage, and an output terminal generating a control signal to control the ON and OFF of the power switch.

2. The control circuit of claim 1, wherein the peak value sample-hold unit comprises:
    an operational amplifier having a first input terminal, a second input terminal and an output terminal, wherein the first input terminal is configured to receive the line voltage sense signal, the second input terminal is coupled to the output terminal;
    a sample resistor coupled between the output terminal of the operational amplifier and a reference ground; and
    a sample capacitor coupled between the output terminal of the operational amplifier and the reference ground; wherein
    the peak value detecting signal is generated at the output terminal of the operational amplifier.

3. The control circuit of claim 1, wherein the clamp unit comprises:
    a first comparator having a first input terminal, a second input terminal and an output terminal, wherein the first input terminal is configured to receive the peak value detecting signal, the second input terminal is configured to receive a first reference voltage, wherein based on the peak value detecting signal and the first reference voltage, the first comparator generates a first comparison signal at the output terminal;

a second comparator having a first input terminal, a second input terminal and an output terminal, wherein the first input terminal is configured to receive the peak value detecting signal, the second input terminal is configure to receive a second reference voltage, wherein based on the peak value detecting signal and the second reference voltage, the second comparator generates a second comparison signal at the output terminal;

a first arithmetic unit having a first input terminal, a second input terminal and an output terminal, wherein the first input terminal is configured to receive the peak value detecting signal, the second input terminal is configured to receive a first value, wherein the arithmetic unit generates a first clamp level at the output terminal by multiplying the peak value detecting signal with the first value;

a second arithmetic unit having a first input terminal, a second input terminal and an output terminal, wherein the first input terminal is configured to receive the peak value detecting signal, the second input terminal is configured to receive a second value, wherein the second arithmetic unit generates a second clamp level at the output terminal by multiplying the peak value detecting signal with the second value;

a third arithmetic unit having a first input terminal, a second input terminal and an output terminal, wherein the first input terminal is configure to receive the peak value detecting signal, the second input terminal is configured to receive a third value, wherein the third arithmetic unit generates a third clamp level at the output terminal by multiplying the peak value detecting signal with the third value; and a controllable selector having a first input terminal, a second input terminal, a third input terminal, a first control terminal, a second control terminal and an output terminal, wherein the first input terminal is coupled to the output terminal of the first arithmetic unit to receive the first clamp level, the second input terminal is coupled to the output terminal of the second arithmetic unit to receive the second clamp level, the third input terminal is coupled to the output terminal of the third arithmetic unit to receive the third clamp level, the first control terminal is coupled to the output terminal of the first comparator to receive the first comparison signal, the second control terminal is coupled to the output terminal of the second comparator to receive the second comparison signal, wherein based on the first comparison signal and the second comparison signal, the controllable selector selects either the first clamp level, the second clamp level, or the third clamp level as the clamp signal at the output terminal.

4. The control circuit of claim 3, wherein the first arithmetic unit, the second arithmetic unit and the third arithmetic unit all comprise a multiplier.

5. The control circuit of claim 1, wherein the clamp unit comprises:

a first comparator having a first input terminal, a second input terminal and an output terminal, wherein the first input terminal is configured to receive the peak value detecting signal, the second input terminal is configured to receive a first reference voltage, wherein based on the peak value detecting signal and the first reference voltage, the first comparator generates a first comparison signal at the output terminal;

a second comparator having a first input terminal, a second input terminal and an output terminal, wherein the first input terminal is configured to receive the peak value detecting signal, the second input terminal is configure to receive a second reference voltage, wherein based on the peak value detecting signal and the second reference voltage, the second comparator generates a second comparison signal at the output terminal;

a first voltage divider with a first dividing coefficient configured to receive the peak value detecting signal, and to generate a first clamp level based thereupon;

a second voltage divider with a second dividing coefficient configured to receive the peak value detecting signal, and to generate a second clamp level based thereupon;

a third voltage divider with a third dividing coefficient configured to receive the peak value detecting signal, and to generate a third clamp level based thereupon; and a controllable selector having a first input terminal, a second input terminal, a third input terminal, a first control terminal, a second control terminal and an output terminal, wherein the first input terminal is coupled to the first voltage divider to receive the first clamp level, the second input terminal is coupled to the second voltage divider to receive the second clamp level, the third input terminal is coupled to the third voltage divider to receive the third clamp level, the first control terminal is coupled to the output terminal of the first comparator to receive the first comparison signal, the second control terminal is coupled to the output terminal of the second comparator to receive the second comparison signal, wherein based on the first comparison signal and the second comparison signal, the controllable selector selects either the first damp level, the second damp level, or the third damp level as the damp signal at the output terminal.

6. The control circuit of claim 1, wherein the damp unit comprises:

an arithmetic block having a first input terminal, a second input terminal and an output terminal, wherein the first input terminal is configured to receive the peak value detecting signal, the second input terminal is configured to receive a threshold coefficient, and wherein the arithmetic block generates the damp signal at the output terminal by multiplying the threshold coefficient with the square of the peak value detecting signal.

7. The control circuit of claim 6, wherein the arithmetic block comprises a multiplier.

8. The control circuit of claim 1, wherein the damp unit comprises:

an arithmetic block having a first input terminal, a second input terminal and an output terminal, wherein the first input terminal is configured to receive the peak value detecting signal, the second input terminal is configured to receive a threshold coefficient, and wherein the arithmetic block generates an arithmetic signal at the output terminal by multiplying the threshold coefficient with the square of the peak value detecting signal; and a selecting block having a first input terminal, a second input terminal and an output terminal, wherein the first input terminal is coupled to the output terminal of the arithmetic block to receive the arithmetic signal, and the second input terminal is configured to receive a set voltage, wherein based on selecting the signal with the higher voltage between the arithmetic signal and the set voltage, the selecting block generates the clamp signal at the output terminal.

9. A power factor correction circuit, comprising:
a first input port and a second input port configured to receive an input AC voltage;
an output port configured to provide a regulated voltage;
a rectifier bridge coupled to the first input port and the second input port to receive the input AC voltage, and to generate a DC voltage based thereupon;
an energy storage component coupled to the rectifier bridge;
a power switch coupled between the energy storage component and a reference ground;
a second switch coupled between the energy storage component and the output port, wherein the second switch and the power switch are controlled to be ON and OFF complementarily; and
a control circuit configured to provide a control signal to the power switch, wherein the control circuit comprises:
a peak value sample-hold unit configured to receive a line voltage sense signal indicative of the input AC voltage, and to generate a peak value detecting signal;
a clamp unit coupled to the peak value sample-hold unit to receive the peak value detecting signal, and to generate a clamp signal;
a selecting unit having a first input terminal coupled to the clamp unit to receive the clamp signal, a second input terminal configured to receive the line voltage sense signal, and an output terminal generating a peak current reference signal by selecting the signal with the lower voltage between the clamp signal and the line voltage sense signal;
a current comparator having a first input terminal coupled to the output terminal of the selecting unit to receive the peak current reference signal, a second input terminal configured to receive a current sense signal indicative of a current flowing through the power switch, and an output terminal generating a current comparison signal based on the peak current reference signal and the current sense signal; and
a controller having a first input terminal coupled to the output terminal of the current comparator to receive the current comparison signal, a second input terminal configured to receive a feedback signal indicative of the regulated voltage, and an output terminal generating a control to control the ON and OFF of the power switch.

10. The power factor correction circuit of claim 9, wherein the peak value sample-hold unit comprises:
an operational amplifier having a first input terminal, a second input terminal and an output terminal, wherein the first input terminal is configured to receive the line voltage sense signal, the second input terminal is coupled to the output terminal;
a sample resistor coupled between the output terminal of the operational amplifier and the reference ground; and
a sample capacitor coupled between the output terminal of the operational amplifier and the reference ground; wherein
the peak value detecting signal is generated at the output terminal of the operational amplifier.

11. The power factor correction circuit of claim 9, wherein the clamp unit comprises:
a first comparator having a first input terminal, a second input terminal and an output terminal, wherein the first input terminal is configured to receive the peak value detecting signal, the second input terminal is configured to receive a first reference voltage, wherein based on the peak value detecting signal and the first reference voltage, the first comparator generates a first comparison signal at the output terminal;
a second comparator having a first input terminal, a second input terminal and an output terminal, wherein the first input terminal is configured to receive the peak value detecting signal, the second input terminal is configure to receive a second reference voltage, wherein based on the peak value detecting signal and the second reference voltage, the second comparator generates a second comparison signal at the output terminal;
a first arithmetic unit having a first input terminal, a second input terminal and an output terminal, wherein the first input terminal is configured to receive the peak value detecting signal, the second input terminal is configured to receive a first value, wherein the arithmetic unit generates a first clamp level at the output terminal by multiplying the peak value detecting signal with the first value;
a second arithmetic unit having a first input terminal, a second input terminal and an output terminal, wherein the first input terminal is configured to receive the peak value detecting signal, the second input terminal is configured to receive a second value, wherein the second arithmetic unit generates a second clamp level at the output terminal by multiplying the peak value detecting signal with the second value;
a third arithmetic unit having a first input terminal, a second input terminal and an output terminal, wherein the first input terminal is configure to receive the peak value detecting signal, the second input terminal is configured to receive a third value, wherein the third arithmetic unit generates a third damp level at the output terminal by multiplying the peak value detecting signal with the third value; and
a controllable selector having a first input terminal, a second input terminal, a third input terminal, a first control terminal, a second control terminal and an output terminal, wherein the first input terminal is coupled to the output terminal of the first arithmetic unit to receive the first damp level, the second input terminal is coupled to the output terminal of the second arithmetic unit to receive the second clamp level, the third input terminal is coupled to the output terminal of the third arithmetic unit to receive the third clamp level, the first control terminal is coupled to the output terminal of the first comparator to receive the first comparison signal, the second control terminal is coupled to the output terminal of the second comparator to receive the second comparison signal, wherein based on the first comparison signal and the second comparison signal, the controllable selector selects either the first damp level, the second damp level or the third damp level as the clamp signal at the output terminal.

12. The power factor correction circuit of claim 9, wherein the damp unit comprises:
a first comparator having a first input terminal, a second input terminal and an output terminal, wherein the first input terminal is configured to receive the peak value detecting signal, the second input terminal is configured to receive a first reference voltage, wherein based on the peak value detecting signal and first reference voltage, the first comparator generates a first comparison signal at the output terminal;
a second comparator having a first input terminal, a second input terminal and an output terminal, wherein the first input terminal is configured to receive the peak value detecting signal, the second input terminal is configure to receive a second reference voltage, wherein based on the peak value detecting signal and the second reference voltage, the second comparator generates a second comparison signal at the output terminal;

a first voltage divider with a first dividing coefficient configured to receive the peak value detecting signal, and to generate a first clamp level based thereupon;

a second voltage divider with a second dividing coefficient configured to receive the peak value detecting signal, and to generate a second clamp level based thereupon;

a third voltage divider with a third dividing coefficient configured to receive the peak value detecting signal, and to generate a third clamp level based thereupon; and a controllable selector having a first input terminal, a second input terminal, a third input terminal, a first control terminal, a second control terminal and an output terminal, wherein the first input terminal is coupled to the first voltage divider to receive the first clamp level, the second input terminal is coupled to the second voltage divider to receive the second clamp level, the third input terminal is coupled to the third voltage divider to receive the third clamp level, the first control terminal is coupled to the output terminal of the first comparator to receive the first comparison signal, the second control terminal is coupled to the output terminal of the second comparator to receive the second comparison signal, wherein based on the first comparison signal and the second comparison signal, the controllable selector selects either the first clamp level, the second clamp level or the third clamp level as the clamp signal at the output terminal.

13. The power factor correction circuit of claim 9, wherein the clamp unit comprises:

an arithmetic block having a first input terminal, a second input terminal and an output terminal, wherein the first input terminal is configured to receive the peak value detecting signal, the second input terminal is configured to receive a threshold coefficient, and wherein the arithmetic block generates the clamp signal at the output terminal by multiplying the threshold coefficient with the square of the peak value detecting signal.

14. The power factor correction circuit of claim 13, wherein the arithmetic block comprises a multiplier.

15. The power factor correction circuit of claim 9, wherein the clamp unit comprises:

an arithmetic block having a first input terminal, a second input terminal and an output terminal, wherein the first input terminal is configured to receive the peak value detecting signal, the second input terminal is configured to receive a threshold coefficient, and wherein the arithmetic block generates an arithmetic signal at the output terminal by multiplying the threshold coefficient with the square of the peak value detecting signal; and a selecting block having a first input terminal, a second input terminal and an output terminal, wherein the first input terminal is coupled to the output terminal of the arithmetic block to receive the arithmetic signal, and the second input terminal is configured to receive a set voltage, wherein based on selecting the signal with the higher voltage between the arithmetic signal and the set voltage, the selecting block generates the damp signal at the output terminal.

16. The power factor correction circuit of claim 9, further comprising a feedback circuit configured to receive the regulated voltage, and to generate the feedback signal.

17. A method used for a power factor correction circuit configured to provide a regulated voltage, wherein the power factor correction circuit comprises at least a power switch, the method comprising:

receiving an input AC voltage;

rectifying the input AC voltage to a DC voltage;

generating a peak value detecting signal by sampling and holding the peak value of a line voltage sense signal indicative of the DC voltage;

generating a damp signal in response to the peak value detecting signal and a threshold coefficient;

comparing the damp signal with the line voltage sense signal to select the signal with the lower voltage as a peak current reference signal;

comparing the peak current reference signal with a current sense signal indicative of a current flowing through the power switch to generate a current comparison signal; and generating a control signal in response to the current comparison signal and a feedback signal indicative of the regulated voltage to control the power switch to be ON and OFF.

18. The method of claim 17, wherein the step of generating a clamp signal in response to the peak value detecting signal and a threshold coefficient comprises: multiplying the threshold coefficient and the square of the peak value detecting signal to generate the clamp signal.

* * * * *